3,816,492
NICKEL CYCLOHEXYLAMINE COMPLEXES OF 2,2'-THIOBIS(p-ALKYLPHENOL) AND USE IN POLYOLEFINS

Joseph Anthony Stretanski, Clinton, and Joseph Adrian Hoffman, Somerville, N.J., assignors to American Cyanamid Company, Stamford, Conn.
No Drawing. Filed Apr. 3, 1972, Ser. No. 240,764
Int. Cl. C07f 15/04
U.S. Cl. 260—439 R       2 Claims

ABSTRACT OF THE DISCLOSURE

Nickel cyclohexylamine complexes of 2,2'-thiobis(p-alkylphenol) are new compounds, useful as ultraviolet light stabilizers and dye receptors for polyolefins.

---

This invention relates to novel nickel amine complexes of thiobisphenols and their use to stabilize polyolefins against deterioration by ultraviolet radiation. More particularly, it relates to a nickel cyclohexylamine complex of 2,2'-thiobis(p-alkylphenol), especially 2,2'-thiobis(p-t-octylphenol), and its use as a light stabilizer for polyolefins.

Foster U.S. Pats. 3,215,717 and 3,313,770 disclose nickel amine complexes of 2,2'-thiobis(p-alkylphenol), especially 2,2'-thiobis(p-t-octylphenol), and their use to stabilize polyolefins against deterioration by ultraviolet radiation. Such complexes have the formula

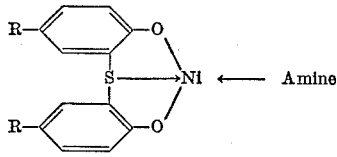

wherein R is alkyl of 1–18 carbons, especially t-octyl. Illustrative of the amines disclosed as complexed to the nickel in the Foster patents are n-butylamine (Example 8), dodecylamine (Example 3), ammonia (Example 1), and aniline (Example 4), although other amines are also disclosed therein.

Polyolefins are thermoplastic polymers and, as such, are normally heated to permit flow in molding processes, such as injection molding, extruding, blow-molding, and fiber spinning. Although the nickel amine complexes of the Foster patents are excellent for retarding the degradation of polyolefins by ultraviolet light, they are not as stable to heat as might be desired. Therefore, molded polyolefin compositions containing these nickel amine complexes of the Foster patents tend to be discolored due to partial degradation of the nickel amine complex itself on exposure to heat during molding of the polyolefin. This degradation is manifested by a distinct discoloration with time at processing temperatures progressing from pale yellow-green through brownish-green to black. This tendency to discolor on exposure to heat is related to the thermal stability of the nickel amine complex and is independent of processing antioxidants present in the compositions to protect the polyolefin. This is a definite drawback to the use of these complexes as ultraviolet light stabilizers for polyolefins.

When used to provide ultraviolet light stability in polyolefin fibers, these nickel amine complexes also serve as dye-sites for nickel-chelatable dyes used to color the fibers. While the nickel in these complexes is readily available to the chelatable dye, the tendency to discolor due to exposure to heat in forming such polyolefin fibers tends to interfere with the purity of the color obtained.

In accordance with the present invention, it has been discovered that the corresponding complexes wherein the amine is cyclohexylamine are uniquely surprisingly resistant to such thermal degradation in polyolefin compositions while still retaining the excellent ability to stabilize such compositions against degradation of ultraviolet radiation. Thus, the nickel-cyclohexylamine complexes of the present invention have the formula

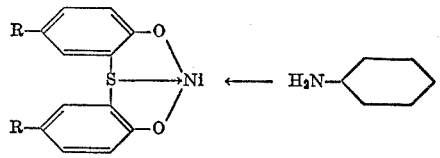

wherein R is alkyl of 1–18 carbons. The preferred compound of this invention is the one where R is t-octyl, having the formula

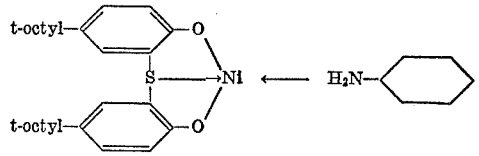

Other nickel cyclohexylamine complexes within the scope of the present invention include those wherein R is butyl, hexyl, cyclohexyl, ethyl, nonyl, dodecyl, amyl, and octadecyl.

The nickel cyclohexylamine complexes of 2,2'-thiobis(p-alkylphenol) of the present invention can be prepared by the same process as the nickel amine complexes of the Foster patents using cyclohexylamine as the amine. Thus, the 1:1 aquo complex of the nickel complex of the 2,2'-thiobis(p-alkylphenyl), prepared as in Example 2 of the Foster patents, and cyclohexylamine dissolved in a solvent, such as benzene or chloroform, is evaporated to dryness to produce the nickel cyclohexylamine complex of the 2,2'-thiobis(p-alkylphenyl). Alternatively, cyclohexylamine is added to a solution of the 2,2'-thiobis(p-alkylphenol) in chloroform and then an excess of an aqueous 20% solution of nickel acetate is added and the whole multiphase system is agitated. After separation of the chloroform layer and evaporating to dryness, the nickel cyclohexylmine complex of the 2,2'-thiobis(p-alkylphenol) remains as a dry residue.

The nickel cyclohexylamine complexes of this invention can be used to stabilize and/or impart dye receptivity to a variety of polymers. Polyolefins, such as polyethylene and polypropylene are of primary importance although they can be used in polycarbonates and polyamides also. In such uses, the nickel cyclohexylamine complex is usually used at a concentration of 0.01% to about 5% by weight, preferably between 0.2% and 2% by weight, based on the polymer weight. Since the nickel cyclohexylamine complexes of this invention are surprisingly resistant to thermal degradation and discoloration, dyeings of fibers containing them are much truer in color as compared to the less thermally resistant nickel amine complexes of the Foster patents.

These new nickel cyclohexylamine complexes of 2,2'-thiobis(p-alkylphenol) of the present invention show superior properties as stabilizers in polymers, such as polyolefins, in various respects. They impart very little or no color to the composition; have good compatibility, so that fairly high concentrations can be employed without blooming; have relatively low volatility, so that the complex is retained in the composition without substantial loss at elevated molding temperatures and for long times in use of products made therefrom; have a high degree of light and heat stability, so that there is minimum loss due to deterioration of the complex; and are effective in preventing or minimizing discoloration, brittleness, and loss of tensile strength in such compositions.

The nickel cyclohexylamine complexes of the present invention are also advantageously used in the polymer substrate in combination with other additives or secondary stabilizers. Ultraviolet light absorbers, for example, can be employed in combination with these nickel cyclohexylamine complexes. Any ultraviolet light absorber can be employed so long as it performs the functions generally required of an ultraviolet light absorber for polymers. These functions are well known to be high absorbency in the region of about 300–400 millimicrons, low absorbency in the region above about 400 millimicrons, and solubility in and compatibility with polymers as well as stability towards light and heat. Examples of ultraviolet light absorbers which can be used can be found in column 3, lines 14–55 of Bright U.S. Pat. 3,636,022 and column 4, lines 1–17 of Murray et al. U.S. Pat. 3,636,023.

When used in combination with such ultraviolet light absorbers, the nickel cyclohexylamine complexes of the present invention enhance the stability of the polymer against degradation by ultraviolet radiation and substantially reduce the color of the polymeric compositions. In addition, these nickel cyclohexylamine complexes exhibit improved heat stability and color, both initially and after exposure to elevated temperatures as compared to the nickel amine complexes of the Foster patents. This is particularly important in polymer fibers since the combinations with the nickel amine complexes of the Foster patents have heretofore imparted a yellow coloration to the fibers causing problems with shade changes and dyeings. This difficulty is substantially eliminated by use of the nickel cyclohexylamine complexes of this invention. When used in combinations with such ultraviolet light absorbers, the combined content of these additives can be from about 0.05% to about 5% on weight of polymer, and preferably from 0.1% to 3% by weight. The relative amounts of the nickel cyclohexylamine complex to the ultraviolet light absorber in the combination can range from 20:1 to 1:20.

The polymer compositions may also contain in addition to these nickel cyclohexylamine complexes an UV absorbers such other additives as may be needed or desired, for example, hindered phenol antioxidants such as 2,6-di-tert.butyl-p-cresol; 2,4,6-tri-t-butylphenol; 3,5-di-tert.butyl-4-hydroxyphenylpropionic acid, octadecyl ester; and the like; secondary stabilizers such as distearylthiodipropionate; pigments; dyes; lubricants; and the like.

The effectiveness of the nickel complexes of this invention in polymers can be evaluated in a number of ways. The heat stability of the new complexes can be determined by dry blending with a polymer followed by milling. A milled sheet can then be cut into strips which are inserted into a Melt Index Apparatus set 290° C. An extrudate can be removed at regular intervals in order to obtain a color profile for each composition. The discoloration of the extrudates upon aging is given a numerical rating, each number above zero indicating a degree of discoloration:

0—no change
1—yellow-green
2—tan-green
3—slightly gray-tan
4—brown-green
5—gray-green
6—brown
7—gray
8—dark brown
9—black The effectiveness of the nickel cyclohexylamine complexes of this invention as light stabilizers can be determined by incorporating the compounds into the polymers by extrusion and pelletizing and then re-extruding into monofilaments with a draw ratio of 7:1. The monofilaments can then be tested for retention of physical properties during Xenon Weather-Ometer and Florida exposure.

The invention is further illustrated by the following examples.

EXAMPLE I

The nickel complexes shown in the accompanying table were incorporated (1% by weight) into unstabilized polypropylene; 0.2% 2,4,6-tri-t.butylphenol was added as a processing antioxidant. The polypropylene and the nickel complexes were dry blended and milled on a standard plastic mill. The milled samples were cut into strips and inserted into a Melt Index Apparatus at 290° C. and an extrudate removed every minute for 15 minutes in order to obtain a thermal discoloration profile for each composition, each extrudate being assigned a numerical color rating from 0–9 as described above.

TABLE I

[Color rating of polypropylene containing 1% nickel amine complex of 2,2′-thiobis(p-t-octylphenol) where amine is as indicated]

| Amine | Aging at 290° C. for— | | | | | |
|---|---|---|---|---|---|---|
| | 2 min. | 5 min. | 7 min. | 10 min. | 13 min. | 15 min. |
| Cyclohexylamine | 0 | 0 | 0 | 2 | 3 | 5 |
| n-Butylamine | 0 | 5 | 6 | 8 | 9 | 9 |
| 2-ethylhexylamine | 0 | 3 | 6 | 6 | 8 | 9 |
| Dodecylamine | 0 | 1 | 3 | 5 | 7 | 9 |
| Ammonia | 1 | 6 | 8 | 8 | 9 | 9 |
| Aniline | 3 | 4 | 8 | 8 | 9 | 9 |

The data in Table I illustrate the greatly improved thermal stability of the nickel cyclohexylamine complex of this invention compared with the nickel amine complexes of the Foster patents.

EXAMPLE II

Light stability of polypropylene containing 1% nickel amine complex

The nickel n-butylamine complex and the nickel cyclohexylamine complex of 2,2′-thiobis(4-t.octylphenol) were separately incorporated into separate samples of unstabilized polypropylene containing 0.1% pentaerythrityl tetrakis [3(3,5-di-t-butyl-4-hydroxyphenyl)] propionate, 0.2% distearylthiodipropionate, and 0.25% $TiO_2$ by extrusion and pelletization. The pellets were re-extruded into monofilaments with a draw ratio of 7:1. The monofilaments were tested for retention of physical properties during Xenon Weather-Ometer and Florida outdoor exposure tests. The data are shown in Table II.

TABLE II

| Nickel amine complex of 2,2′-Thiobis-(p-t-octylphenol) Amine sample | Initial | | Percent original strength retained, Florida, after— | | | |
|---|---|---|---|---|---|---|
| | Denier | Tenacity | 2 mo. | 4 mo. | 5 mo. | 6 mo. |
| n-Butylamine | 82 | 6.5 | 90 | 54 | 37 | |
| Cyclohexylamine | 91 | 6.6 | 92 | 62 | 43 | 39 |

| | Xenon Weather-Ometer after— | | | | |
|---|---|---|---|---|---|
| | 400 hr. | 800 hr. | 1,000 hr. | 1,100 hr. | 1,200 hr. |
| n-Butylamine | 89 | 67 | 52 | 43 | |
| Cyclohexylamine | 95 | 80 | 58 | | 52 |

The data demonstrate that the nickel cyclohexylamine complex of this invention is as good as or slightly better than the nickel n-butylamine complex of the Foster patents as an ultraviolet light stabilizer.

We claim:
1. A complex having the formula

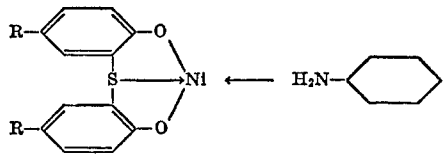

wherein R is alkyl of 1–18 carbons.

2. A complex as defined in claim 1 wherein R is t-octyl.

References Cited
UNITED STATES PATENTS

| | | | |
|---|---|---|---|
| 3,215,717 | 11/1965 | Foster | 260—45.75 N |
| 3,218,294 | 11/1965 | Rodgers et al. | 260—45.75 N |
| 3,557,225 | 1/1971 | Kubicek | 260—681.5 R |
| 3,636,022 | 1/1972 | Bright | 260—429 D |
| 3,636,023 | 1/1972 | Murray et al. | 260—429 D |
| 3,692,738 | 9/1972 | Mathis et al. | 260—45.75 N |

DANIEL E. WYMAN, Primary Examiner

A. P. DEMERS, Assistant Examiner

U.S. Cl. X.R.

8—31, 100; 252—400, 401, 402, 403; 260—45.75 N